Aug. 8, 1961     V. A. STIFANO, JR     2,995,033
APPARATUS FOR TENSIONING THREADED MEMBERS
Filed Jan. 14, 1960     2 Sheets-Sheet 1
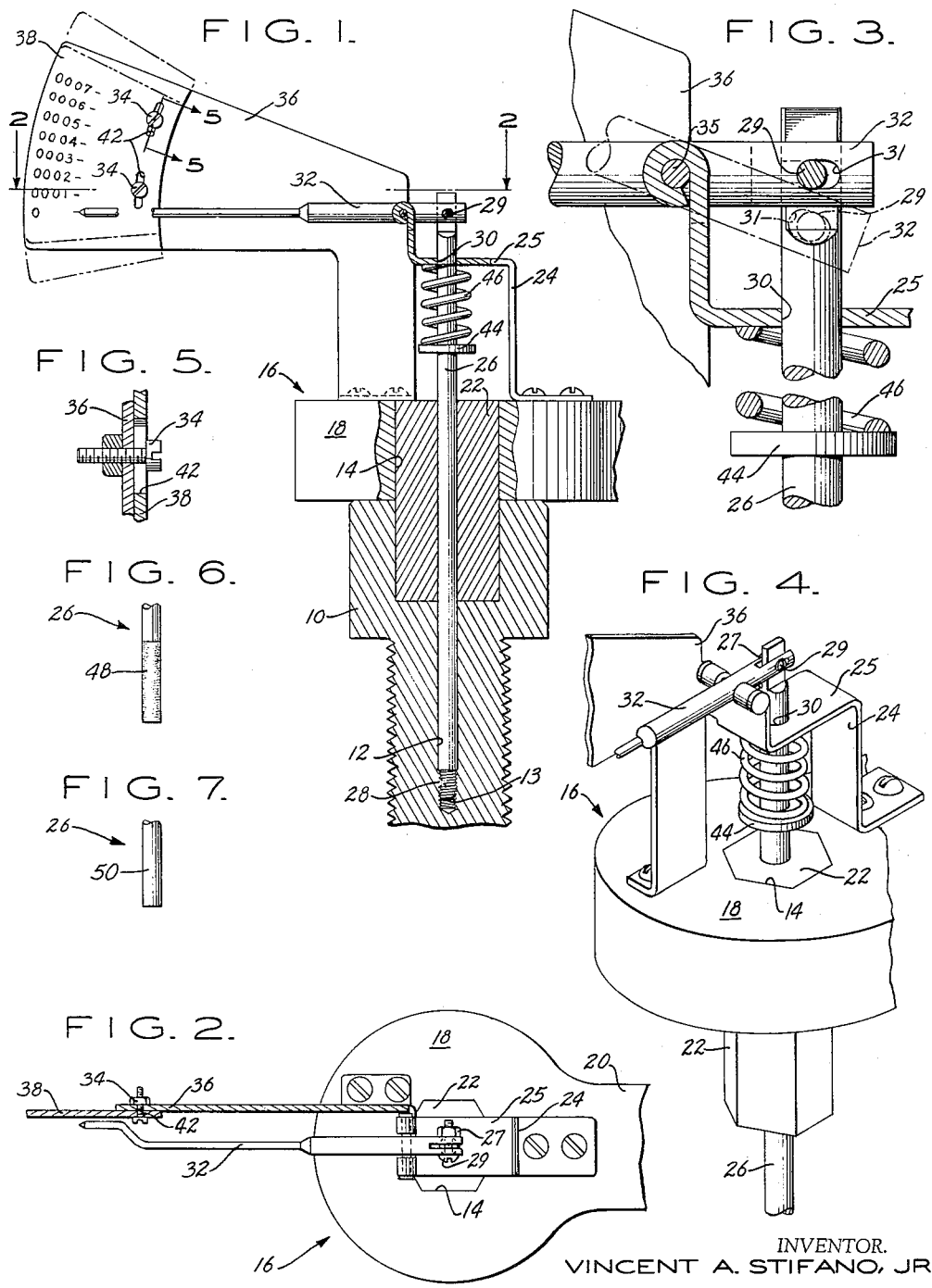
INVENTOR.
VINCENT A. STIFANO, JR.
BY
Morgan, Finnegan, Durham & Pine Aug. 8, 1961     V. A. STIFANO, JR     2,995,033
APPARATUS FOR TENSIONING THREADED MEMBERS
Filed Jan. 14, 1960     2 Sheets-Sheet 2

INVENTOR.
VINCENT A. STIFANO, JR.
BY
Morgan, Finnegan, Durham & Pine

United States Patent Office 2,995,033
Patented Aug. 8, 1961

2,995,033
APPARATUS FOR TENSIONING THREADED MEMBERS
Vincent Anthony Stifano, Jr., Wethersfield, Conn., assignor to The Holo-Krome Screw Corporation, Hartford, Conn., a corporation of Connecticut
Filed Jan. 14, 1960, Ser. No. 2,420
17 Claims. (Cl. 73—141)

The present invention relates to tension measuring devices and more particularly to a device for measuring the amount of elongation of a threaded member being tensioned.

In the use of threaded members such as bolts or studs, it is desirable to tighten them until the initial preload stress therein is at least equal to the external force to be applied thereto. Such an arrangement minimizes failure of the member on the load. Further, where a plurality of bolts are employed such as in an engine block, it is essential that uniform tension be applied to all bolts to prevent warping or other damage to the block under operating conditions.

Heretofore a device such as a torque wrench was generally employed to apply the desired tension to the threaded members. Such device measured the amount of tension applied to the threaded member to achieve the desired tightening thereof. However, variations in bolt threads, friction losses and expansion of the nut under load resulted in considerable variation in the tension of the threaded members to which the torque was applied.

Other mechanisms have been proposed for measuring the tension in a threaded member; such as, devices for measuring the amount of rotation of the tightened members. However, other mechanisms, heretofore generally available, have been either too complicated for operation by ordinary mechanics, did not produce the desired results or were directed to specific limited applications.

Objects and advantages of the invention will be obvious herefrom, or may be learned by practice with the invention, the same being realized and attained by means of the instrumentalities and combinations pointed out in the appended claims.

The present invention is characterized by the provision of a simple device for measuring the amount of elongation of a threaded member being tightened. In accordance with the invention, a recess is formed; as by drilling, in the top of the threaded member or bolt and preferably axially therewith. A tightener element having a slidable indicator rod is inserted in the recess and maintained therein. As the threaded member is tightened by actuating the tightener element the indicator rod, moving with the member and sliding in the tightener element, registers the amount of elongation of the threaded member on a suitable associated gauge. Thus, the exact amount of preload stress on the member is readily available, assuring exact preloading of all threaded members tightened.

In the preferred embodiment an indicator rod is threaded into the member to be tightened and resiliently mounted therein. Likewise, the tightener element is formed as an integral part of a wrench device. However, in modified forms of this invention other means, such as cement or a magnet, is employed to join the indicator rod and threaded member. Further, the tightener element may be provided with an annular magnet or gripping device to permit the use of ordinary open end or box wrenches therewith.

It is therefore an object of this invention to provide a simple, efficient and novel device for measuring the amount of elongation of a threaded member to determine the preload stress therein.

It is another object of this invention to provide in a device for measuring the preload stress in a threaded member having a recess formed in the top therein, a tightener element for tightening the threaded member and an indicator rod associated with the threaded member and the tightener element for determining the exact amount of elongation of the threaded member as it is tightened.

A further object of the present invention is to provide an elongation measuring device for determining the preload stress of a threaded member of a device characterized by provision of a tightener element adapted to be received in a recess formed in a threaded member and a slidably mounted indicator rod positioned in the recess and tightener element which registers the exact amount of elongation of the threaded member as it is tightened.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

FIGURE 1 is a side elevation partly in section of the preferred embodiment of the present invention illustrated in operative tightening position;

FIGURE 2 is a plan view of the mechanism illustrated in FIGURE 1 and taken along line 2—2 of FIGURE 1.

FIGURE 3 is a detailed view partly in section of the indicator rod mountings;

FIGURE 4 is a partial perspective view of the mechanism illustrated in FIGURE 1;

FIGURE 5 is a sectional view taken along line 5—5 of FIGURE 1;

FIGURE 6 illustrates a modified form of the indicator rod securing tip;

FIGURE 7 illustrates another modified form of the indicator rod securing tip;

Figure 8:
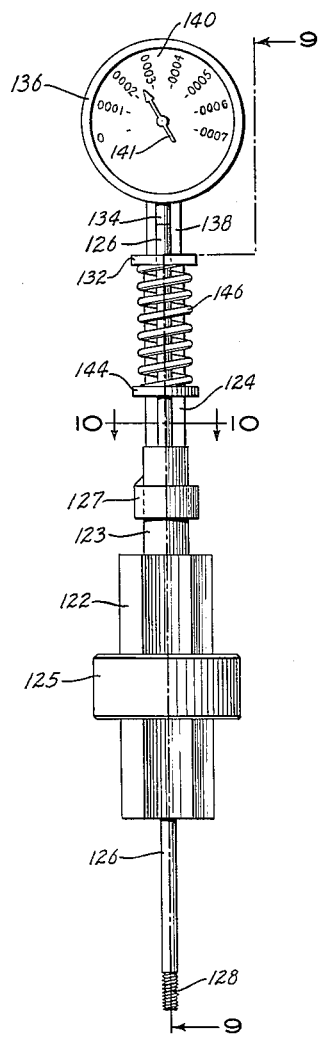
FIGURE 8 is a front elevation of a modified form of the present invention.

Referring specifically to FIGURE 1, there is illustrated the preferred embodiment of the present invention, shown mounted in operative position in a suitable threaded member; such as, bolt 10. Bolt 10 is provided, as by drilling, with a suitable longitudinal axial recess or bore extending partially therethrough. This bore includes preferably a rounded, elongated lower section 12 and an interconnected generally hexagonal upper section 14 in the head end of bolt 10.

To tighten bolt 10 in place, there is provided a wrench-like device designated generally 16, which includes a head 18 and a handle 20 (partially shown). Head 18, in turn, has a generally hexagonal tightener element 22 extending transversely therefrom and adapted to fit snugly into section 14. Tightener 22 may be formed integrally with head 18 but preferably is separately formed but secured in place therein.

Mounted on wrench 16 adjacent head 18 thereof is an upright bracket 24 having a section 25 generally parallel to and spaced from the upper surface of head 18. An elongated rod 26 for indicating the amount of elongation of bolt 10 as it is tightened by wrench 16 is slidably mounted axially in tightener element 22 and extends outwardly from each side thereof (see FIGURE 1). The lower section of rod 26 is adapted to fit snugly into section 12 of the recess and is provided with a threaded tip 28 which fits into threaded portion 13 of section 12.

The upper free end of rod 26 passes through a suitable opening 30 provided in section 25 of bracket 24 and is pivotally connected to an indicator or pointer 32 by means of nut 27 and coacting bolt 29, bolt 29 being positioned in an elongated aperture or slot 31 in one end of pointer 32. An indicator gauge 36 is likewise mounted on head 18 adjacent pointer 32. Indicator gauge 36 is provided with a scale 38 adjacent the free end of pointer 32 which is adjustably secured thereto by a pair of set screws 34 and slots 42.

To provide resiliency for rod 26, a collar 44 is secured to rod 26 between the top of tightener element 22 and the underside of section 25 of bracket 24. A suitable spring 46 is positioned around rod 26 with one end thereof bearing against the top of collar 44 while the other end of spring 46 bears against the underside of section 25 of bracket 24.

In operation, bolt 10 is suitably positioned for tightening: such as, in an appropriate threaded hole in an engine block. Preferably bolt 10 has been previously drilled with a longitudinal axial recess including lower elongated section 12 and upper hexagonal section 14. It has been found that a diameter for section 12 of approximately one sixteenth ($\frac{1}{16}$) of an inch for a one quarter ($\frac{1}{4}$) inch N.C. bolt produces satisfactory results.

It will be understood that no internal stress and consequent elongation of bolt 10 is experienced until the head of bolt 10 bears against the flanges or area adjacent the top of its associated threaded opening and further free movement therefore restricted. Hence, it will be evident that bolt 10 may be hand-tightened into its associated hole until it is properly seated adjacent thereto prior to the tightening thereof. Further, if desired, recesses 12 and 14 may be formed in bolt 10 while in such seated position.

With the bolt 10 in place and having recesses 12 and 14 provided therein, wrench 16 and its associated tightener element 22 are placed in operative tightening relationship with bolt 10 as shown in FIGURE 1 with tightener element 22 in recess 14 and rod 26 in recess 12.

To thread tip 28 of rod 26 into threaded portion 13 of section 12, bolt 27 and nut 29 are disengaged and the upper end of rod 26 is disconnected from pointer 32. This permits rotation of rod 26 to seat tip 28 in portion 13. When rod 26 is fully seated in recess 12, the upper end thereof is reconnected by bolt 27 and nut 29 to its associated end of pointer 32.

Scale 38 is then loosened and moved suitably on gauge 36 relative to the free end of pointer 32 to align the zero or initial starting point of scale 38 with the tip of pointer 32.

Tightener element 22 is then actuated by rotation of handle 20, rotating bolt 10 into tightened position in its associated threaded opening.

As bolt 10 is tightened, an internal tensile stress is gradually induced therein, which operates to elongate bolt 10.

Since rod 26 is slidably mounted in tightener element 22 and joined to bolt 10 by threaded tip 28, as bolt 10 elongates, rod 26 is pulled downwardly, sliding axially in tightener element 22 toward bolt 10. This downward movement of rod 26 operates to pivot pointer 32 about its pivotal connection on stud shaft 35. The free end of pointer 32 thus is moved upwardly along scale 38, disclosing the amount of downward movement of rod 26 and hence the amount of elongation of bolt 10 experienced by bolt 10 in becoming fully tightened.

Since, for the particular material comprising bolt 10 and for the particular size and diameter thereof, the amount of elongation has a proportional relationship to the amount of stress in bolt 10 and its Modulus of Elasticity, the amount of elongation of bolt 10 disclosed on scale 38 provides means for determining the internal stress in bolt 10. Conversely, by first determining the amount of elongation of bolt 10 necessary to produce a desired stress therein, when pointer 38 discloses such elongation, the tightening operation of bolt 10 is terminated, with bolt 10 provided with the desired internal stress.

Likewise, to obtain equal tightening of a series of bolts the above described operation is repeated for each bolt until the free end of pointer 32 is adjacent the same point on scale 38 disclosing the same amount of elongation for each of the bolts tightened.

FIGURES 6 and 7 disclose modifications of rod 26 wherein tip 28 thereof is replaced in one instance (FIGURE 6) by a magnetic tip 48. By utilizing a magnetic tip; such as, tip 48, the threaded portion 13 of recess 12 can be eliminated, rod 26 remaining in engagement with bolt 10 in recess 12 by the magnetic attraction between tip 48 and bolt 10 which is generally of magnetizable material; such as, steel. In another instance (FIGURE 7) tip 28 is replaced by a plain tip 50 which, if desired, could be provided with a suitable adhesive coating; such as, an epoxy resin, applied thereto.

When either of the modified tips 48 or 50 are used, it will be understood that spring 46 is operative not only to provide resiliency for rod 26, but to normally urge and maintain the end of rod 26 in its associated recess 12. Further, when plain tip 50 is used with an adhesive coating, at the conclusion of the tightening operation when it is desired to withdraw rod 26 from recess 12, rod 26 is merely rotated, severing the bond between the adhesive thereon and the side walls of recess 12, facilitating removal of rod 26.

Figure 9:
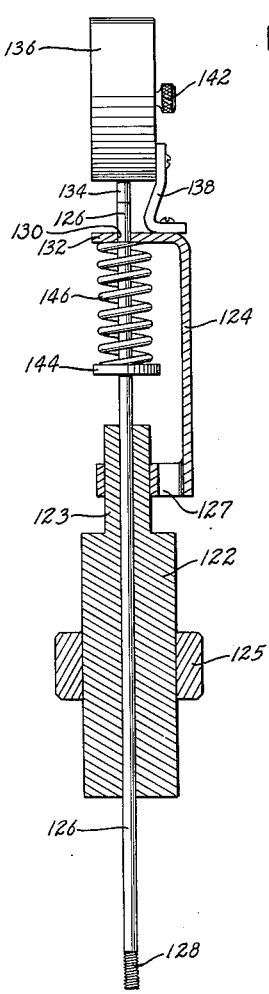
FIGURE 9 is a side elevation partly in section of the mechanism illustrated in FIGURE 8.
Figure 10:
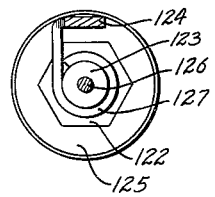
FIGURE 10 is a sectional view taken along line 10—10 of FIGURE 8.

FIGURES 8 and 9 disclose a modified form of the present invention wherein wrench 16 has been replaced by a tightener member 122 adapted to be received in recess 14 of bolt 10 and provided with an annular ring 125 positioned thereabout, preferably formed of magnetic material.

An elongated rod 126 for indicating the amount of elongation of bolt 10 as it is tightened by member 122 is slidably mounted axially in tightener 122 and extends outwardly from each side thereof. The lower section of rod 126 is adapted to fit into recess 12 and provided preferably with a threaded tip 128 to fit into threaded section 13 of recess 12.

Tightener 122 is formed with an extension 123 for supporting one leg 127 generally of a [-shaped bracket 124.

The upper section of rod 126 passes through a suitable opening 130 on the other leg 132 of bracket 24 and is connected to the actuating arm 134 of a suitable dial gauge 136 mounted on bracket 138 supported on leg 132 of bracket 124. Dial gauge 136 is provided with a movable graduated scale 140, an indicating needle or pointer 141 and a scale positioning knob 142.

To provide resiliency for rod 126, a collar 144 is secured to rod 126 between legs 127 and 132 of bracket 124. A suitable spring 146 is positioned around rod 126 with one end thereof bearing against the top of collar 144 while the other end of spring 146 bears against the underside of leg 132 of bracket 124.

In operation, a bolt such as bolt 10 of the preferred embodiment is suitably located in an associated threaded aperture and seated therewith in position to be tightened with recesses 12 and 14 formed therein. Tigthener member 122 is then seated with a portion thereof in recess 14 and rod 126 positioned in elongated recess 12 and joined to bolt 10 by threaded tip 128 into threaded portion 13 of section 12.

With rod 126 full seated in recess 12 knob 142 of gauge 136 is actuated to move the zero or initial starting point of scale 140 opposite the tip of pointer 141 of gauge 136.

A suitable rotating device, such as a wrench, is positioned in engagement with the outer periphery of ring 125 to rotate tightener element 122 for tightening bolt 10 in its associated threaded opening. It will be understood that by forming annular ring 125 of magnetic material engagement is maintained between tightener element 122 and its associated wrench not shown.

Since rod 126 is slidably mounted in tightener element 122 and secured to bolt 10 by threaded tip 128, as bolt 10 is tightened and elongates, rod 126 is pulled downwardly, sliding axially in tightener element 122. This downward movement of rod 126 operates to pull actuating arm 134 of gauge 136 downwardly also. The movement of 136 is transmitted to needle 141 of the dial gauge 136, moving needle 141 along its associated scale 140 disclosing the amount of downward movement of arm 134 and rod 126 and hence the amount of elongation of bolt 10.

It will be understood that the embodiment of the present invention disclosed in FIGURES 8 and 9 could be provided, if desired, with rod securing means disclosed in FIGURES 6 and 7 without adverse effect on the construction or operation of the invention.

Some threaded elements; such as, set screws are compressed under load. It will be understood that the above-described device could, in such case, be employed to equal advantage. Elongated rod 26 or 126 is positioned in a suitable aperture in the set screw and, as stress is suitably induced in such compressed threaded member, rod 26 or 126 moves upwardly. This reverses the direction of movement of indicating pointer 32 and 141, merely requiring suitable positioning and dimensioning of scale 38 or 140 to disclose the amount of compressive stress induced in the threaded member.

Further any other suitable mechanical, electrical or hydraulic device can be employed with equal facility for measuring the amount of movement of rod 26 or 126. Other suitable devices include an illuminated electrical indicating mechanism or a fluid level indicator.

It should be understood that the above description has been made with reference to the preferred embodiment illustrated in the drawings and that slight modification and alteration can be made therein without departing from the invention, except as expressly limited hereinafter in the claims.

What is claimed is:

1. A device for measuring the amount of elongation of a threaded member being tensioned, said member having an internal recess provided partially therein, comprising a tensioning element adapted to be received in a portion of said recess, an indicating member adapted to be received in the remainder of said recess, means mounting said indicating member for movement in said tensioning element, means for securing said indicating member in said recess, means for actuating said tensioning member for tensioning said threaded member, and a gauge device operatively associated with said indicating member for measuring the amount of movement of said indicating member during the actuation of said tensioning element.

2. Apparatus for determining the amount of stress in a threaded member being tightened, said member having an internal axial bore provided partially therein, comprising a tightening device adapted to be received in a portion of said recess, an elongated indicator rod adapted to be received in the remainder of said recess, means slidably mounting said rod in said tightening device, means for securing one end of said rod in said recess, means for actuating said tightening device for tightening said threaded member, a gauge device, means operatively connecting said gauge device to the other end of said rod for measuring the amount of movement of said rod during the actuation of said tightening device.

3. The invention as defined in claim 2 wherein said rod securing means includes a threaded tip on said rod and a cooperating threaded section in said recess.

4. The invention as defined in claim 2 wherein said threaded member is of generally magnetizable material and wherein said thread securing means includes a magnetic element on the end of said rod for maintaining said rod in said recess.

5. The invention as defined in claim 2 wherein said rod securing means includes an adhesive coating on the end of said rod for maintaining said rod in said recess.

6. The invention as defined in claim 2 wherein said gauge is provided with a movable scale and includes means for effecting the setting of said scale at an angle at the start of the tightening operation.

7. Apparatus for tightening a threaded member and determining the internal stress therein, said threaded member having upper and lower interconnected axial recesses formed longitudinally therein and partially therethrough comprising a wrench head, a tightener element mounted in said head and extending transversely therefrom for receipt in said upper recess, an elongated indicator rod slidably mounted axially in said tightening element and adapted to be received in said lower recess, means for securing an end of said rod in said lower recess, a bracket, means mounting said bracket on said head, a pointer, means pivotally mounting said pointer on said bracket, means loosely connecting one end of said pointer to the other end of said elongated rod, a gauge having a graduated scale, means mounting said gauge on said head with said scale adjacent the free end of said pointer, and a handle for actuating said tightener element to tighten said threaded member, said rod being moved axially in said tightener element a distance related to the amount of stress induced into said threaded member.

8. The invention as defined in claim 7 wherein said rod securing means includes a threaded portion on said rod and a cooperating threaded section in said lower recess.

9. The invention as defined in claim 7 wherein said threaded member is of generally magnetizable material and wherein said securing means includes a magnetic element on the end of said rod for maintaining said rod in said recess.

10. The invention as defined in claim 7 wherein said rod securing means includes an adhesive coating on the end of said rod for maintaining said rod in said recess.

11. Apparatus for tightening a threaded member and determining the internal stress therewith, said threaded member having upper and lower interconnected axial recesses formed longitudinally therein and partially therethrough, comprising a tightener element adapted to be received in said upper recess, an elongated indicator rod slidably mounted axially in said tightener element and adapted to be received on said lower recess, means for securing an end of said rod in said lower recess, a bracket, means mounting said bracket and a portion of said tightener element remote from said threaded member, a gauge device, means mounting said gauge device on said bracket, means operatively connecting the free end of said rod to said gauge device, and means on said tightener element for accommodating a tightening device for actuating said tightener element to tighten said threaded member, said rod being moved axially in said tightener element a distance related to the amount of stress induced in said threaded member.

12. The invention as defined in claim 11 wherein said means on said tightener element for accommodating a tightening device includes a magnetic annular ring, said ring adapting said apparatus for cooperation with a wrench.

13. Apparatus for determining the amount of stress in a threaded member being tightened, said member having an internal axial bore provided partially therethrough, the combination comprising a tightening device having a tightener section adapted to fit in cooperating tightening relationship with said threaded member, an elongated indicator rod adapted to be received in said axial bore, means slidably mounting said rod for movement through said tightening device into and out of said axial bore, means for maintaining one end of said rod in said bore, means for actuating said tightening device to tighten said threaded member, a support, means mounting said support on said tightener device, a gauge, means mounting at least a portion of said gauge on said support, and means operatively connecting the other end of said rod remote from said bore to said gauge for measuring the amount of movement of said rod during the actuation of said tightening device.

14. Apparatus for tightening a threaded member and determining the internal stress therein, said threaded member having an axial recess formed longitudinally therein and partially therethrough, the combination comprising a wrench head having a tightener portion adapted to fit in cooperating tightening relationship with said threaded member, an elongated indicator rod slidably mounted in said wrench head and adapted to be received in said axial recess of said threaded member, means for maintaining one end of said rod in said recess, a bracket, means mounting said bracket on said head, a gauge, means mounting at least a portion of said gauge on said bracket, and means operatively connecting the free end of said rod with the portion of said gauge on said bracket for measuring the amount of movement of said rod during the actuation of said wrench head, said rod being moved through said wrench head a distance related to the amount of stress induced into said threaded member during tightening.

15. The invention as defined in claim 14 wherein said means for maintaining said rod in said recess includes a resilient member normally urging said rod into seated position in said recess.

16. The invention as defined in claim 14 wherein said gauge includes a pointer, means pivotally mounting said pointer on said bracket, means connecting one end of said pointer to the free end of said elongated rod, a graduated scale, means mounting said scale on said head adjacent the free end of said pointer whereby as said rod is moved in response to the inducement of stress in said threaded member, said pointer is pivoted along said scale a distance related to the amount of said induced stress.

17. The invention as defined in claim 14 including means for mounting said gauge device on said bracket, an operating arm for said gauge device, and means connecting the free end of said rod to said operating arm whereby said operating arm is moved with said rod a distance related to the amount of stress induced in said threaded member, said operating arm registering said amount of stress on said gauge device.

References Cited in the file of this patent

UNITED STATES PATENTS

| | | |
|---|---|---|
| 2,492,164 | Lutts | Dec. 27, 1949 |
| 2,562,831 | Stone | July 31, 1951 |
| 2,747,454 | Bowersett | May 29, 1956 |